United States Patent [19]

Holben et al.

[11] 3,875,417
[45] Apr. 1, 1975

[54] NUCLEONIC MEASURING APPARATUS
[75] Inventors: Bernard C. Holben, Dublin; Richard E. Bach, Hilliard, both of Ohio
[73] Assignee: Industrial Nucleonics Corporation, Columbus, Ohio
[22] Filed: Feb. 26, 1970
[21] Appl. No.: 14,774

Related U.S. Application Data
[63] Continuation of Ser. No. 634,364, April 27, 1967, abandoned.

[52] U.S. Cl. .............................................. 250/506
[51] Int. Cl. .............................................. G21f 5/04
[58] Field of Search ...... 250/83.3 D, 106, 105, 493, 250/496, 506; 220/89 B, 55.3, 47; 180/107; 292/377; 70/440

[56] References Cited
UNITED STATES PATENTS

| | | | |
|---|---|---|---|
| 2,858,450 | 10/1958 | Holben | 250/83.3 D X |
| 2,932,744 | 4/1960 | Lehman | 250/105 |
| 3,338,255 | 8/1967 | Exline et al. | 220/89 B |
| 3,418,475 | 12/1968 | Hudgens | 250/105 |

*Primary Examiner*—James W. Lawrence
*Assistant Examiner*—Davis L. Willis
*Attorney, Agent, or Firm*—William T. Fryer, III; C. Henry Peterson

[57] ABSTRACT

A nucleonic measuring instrument wherein a housing contains a radiation source and has an aperture controlled by a shutter which is spring loaded to a closed position for confining and shielding the radiation and is movable by a motor to an open position for releasing the radiation, the motor being supplied with power through a heat sensitive element so that it is deenergized and the shutter closes in response to a predetermined high ambient temperature such as may be caused by a fire, and including an explosive blank cartridge positioned in relation to the shutter guide which explodes in response to a still higher ambient temperature, deforming the guide and thereby locking the shutter in the closed position.

8 Claims, 10 Drawing Figures

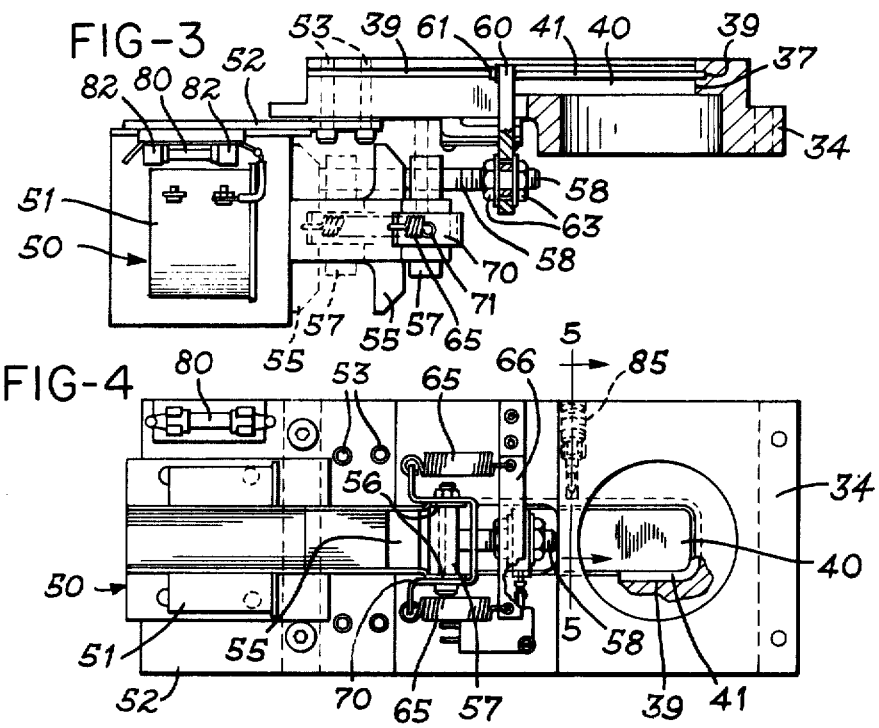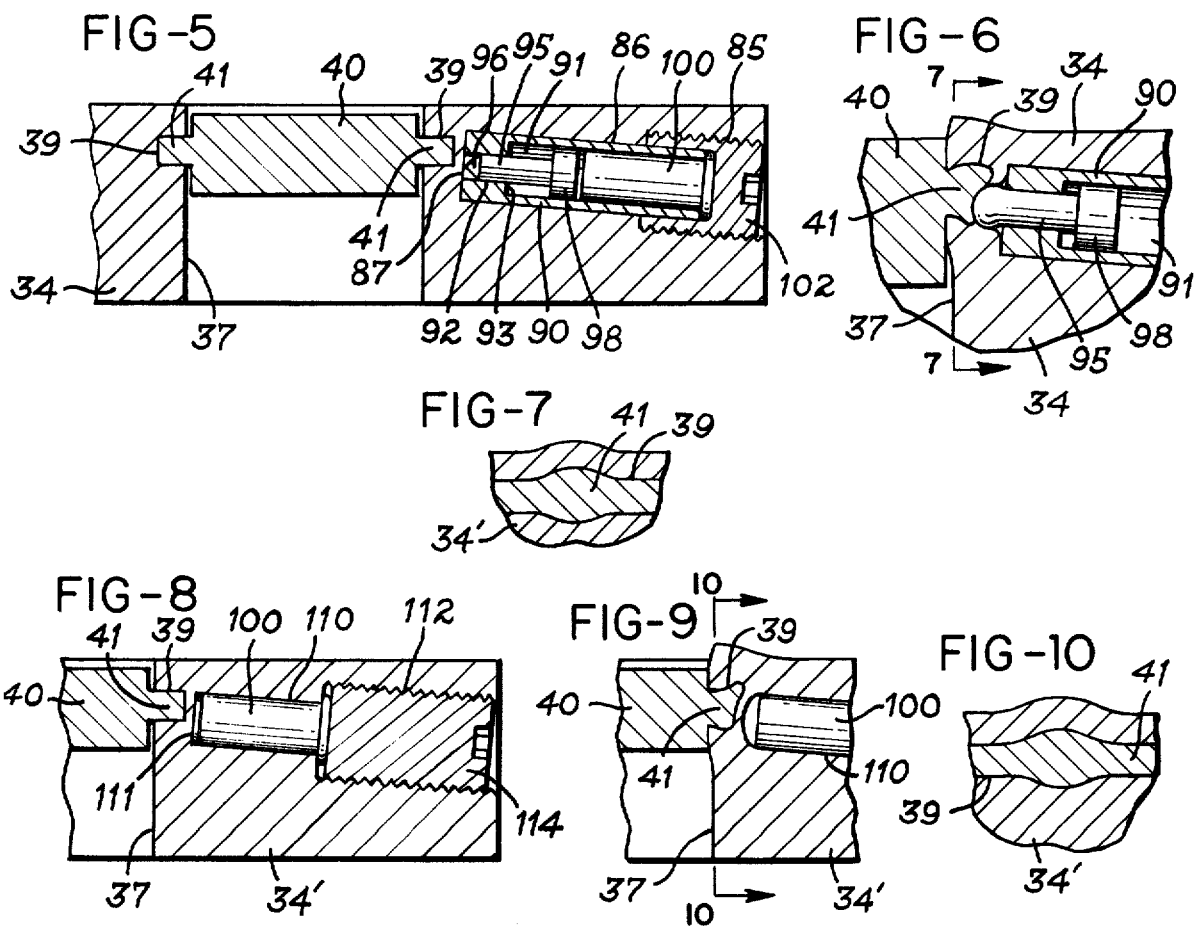

NUCLEONIC MEASURING APPARATUS

PRIOR APPLICATION

This application is a continuation of Ser. No. 634,364 filed Apr. 27, 1967 and now abandoned.

RELATED INVENTIONS

The present invention relates to the inventions disclosed in copending applications Ser. No. 634,363 and now U.S. Pat. No. 3,562,531 of George J. Trachevski and Ernest A. Auborn, and Ser. No. 634,366 and now U.S. Pat. No. 3,567,942 of Richard E. Bach, both assigned to the assignee of the present invention and filed on Apr. 27, 1967.

BACKGROUND OF THE INVENTION

Nucleonic measuring gauges have been provided with source housings having apertures controlled by shutters which are operated by an electric solenoid or by an air motor, or the like, for retracting and permitting the release of the radiation from a suitable nucleonic source within the housing. Examples of such shutters are shown in the U.S. patents of Holben No. 2,858,450 of 1958 and Lehman No. 2,932,744 of 1960, each assigned to the assignee of this invention. These shutters are normally made of heat resistant material and also act as an effective block or shield for the rays emanating from the source, so that when the shutter is closed, the source capsule is effectively sealed within its housing and no substantial radiation emanates through the aperture.

Normally, the shutter mechanisms are "fail-safe" so that upon deenergization of the operating motor, the shutter automatically returns to the closed position such as by the use of retraction springs or the like. In the event of a disaster or conflagration, it is important to maintain the integrity of the source housing and to confine all radiation within the housing. This is accomplished by assuring that the shutter returns to the closed position under such conditions and remains there.

SUMMARY OF THE INVENTION

The present invention relates to nucleonic gauging and measuring apparatus, and more particularly, to such apparatus in which a movable shutter is positioned in relation to the exit aperture for a nucleonic source, and to apparatus for closing and locking the shutter in the event that certain predetermined temperature limits are exceeded.

The invention employs motor means, such as an electric solenoid, for moving the shutter between a closed position where it effectively shields radiation from the source of radioactive material and an open position where the aperture is uncovered. Normally, during the operation of the gauge, the shutter is maintained in its open position with respect to the aperture, by continuously energizing the solenoid. However, it is within the scope of this invention to use other means such as an air-operated motor shown in the Holben and Lehman patents mentioned above.

The invention further includes means responsive to the occurrence of a first predetermined temperature for causing the shutter to close and seal the source capsule within its housing and to render it relatively harmless in the event of fire or the like. This means includes a temperature responsive element, such as a fuse, to interrupt the power to the solenoid so that the shutter is returned to its closed position by the shutter retraction springs.

The present invention also provides for locking the shutter in the closed position upon the occurrence of a still higher predetermined temperature, and specifically provides for the release of energy, such as that caused by the explosion of a blank cartridge, within the base plate forming the guideway for the shutter upon the occurrence of the higher temperature such as would be caused by a fire.

Thus, the present invention provides a nucleonic gauge with a shutter which automatically moves to a closed position upon the occurrence of a first predetermined high environmental or ambient temperature above the normal operating temperature limits of the gauge and which is thereafter locked in the closed position.

An important object of this invention is the provision of a nucleonic gauge including means for locking the source shutter in a closed position upon the occurrence of a predetermined high temperature.

Another object of this invention is the provision of a nucleonic gauge including a shutter which is movable between an open and a closed position, and means for suddenly releasing stored energy, such as by an explosive cartridge, for locking the shutter in the closed position upon the occurrence of a predetermined high temperature.

A more specific object of this invention is the provision of a nucleonic gauge assembly including a shutter operated by a solenoid in series with a temperature sensitive fuse and moved by springs to a closed position, and in which a blank explosive cartridge is provided in or adjacent to the shutter to lock the shutter in its closed position upon the occurrence of a predetermined higher temperature.

These and other objects and advantages of the invention will be apparent from the following description, the accompanying drawings and the appended claims.

BRIEF DESCRIPTION OF THE DRAWINGS

FIG. 3 is an elevational view, partially broken away, of the shutter assembly and its operating mechanism;

FIG. 4 is a bottom view of the apparatus shown in FIG. 3;

FIG. 5 is an enlarged fragmentary section taken generally on the line 5—5 of FIG. 4;

FIG. 6 is an enlarged fragmentary section showing the shutter locked in its closed position;

FIG. 7 is a fragmentary section through the locked shutter and its guideway as taken generally on the line 7—7 of FIG. 6;

FIG. 8 is an enlarged fragmentary section similar to FIG. 5 and showing a modified form of the invention;

FIG. 9 is an enlarged fragmentary section similar to FIG. 6 and showing the shutter of FIG. 8 locked in its closed position; and FIG. 10 is a fragmentary section similar to FIG. 7 as taken generally along the line 10—10 of FIG. 9.

DESCRIPTION OF THE PREFERRED EMBODIMENTS

Figures 1, 2:
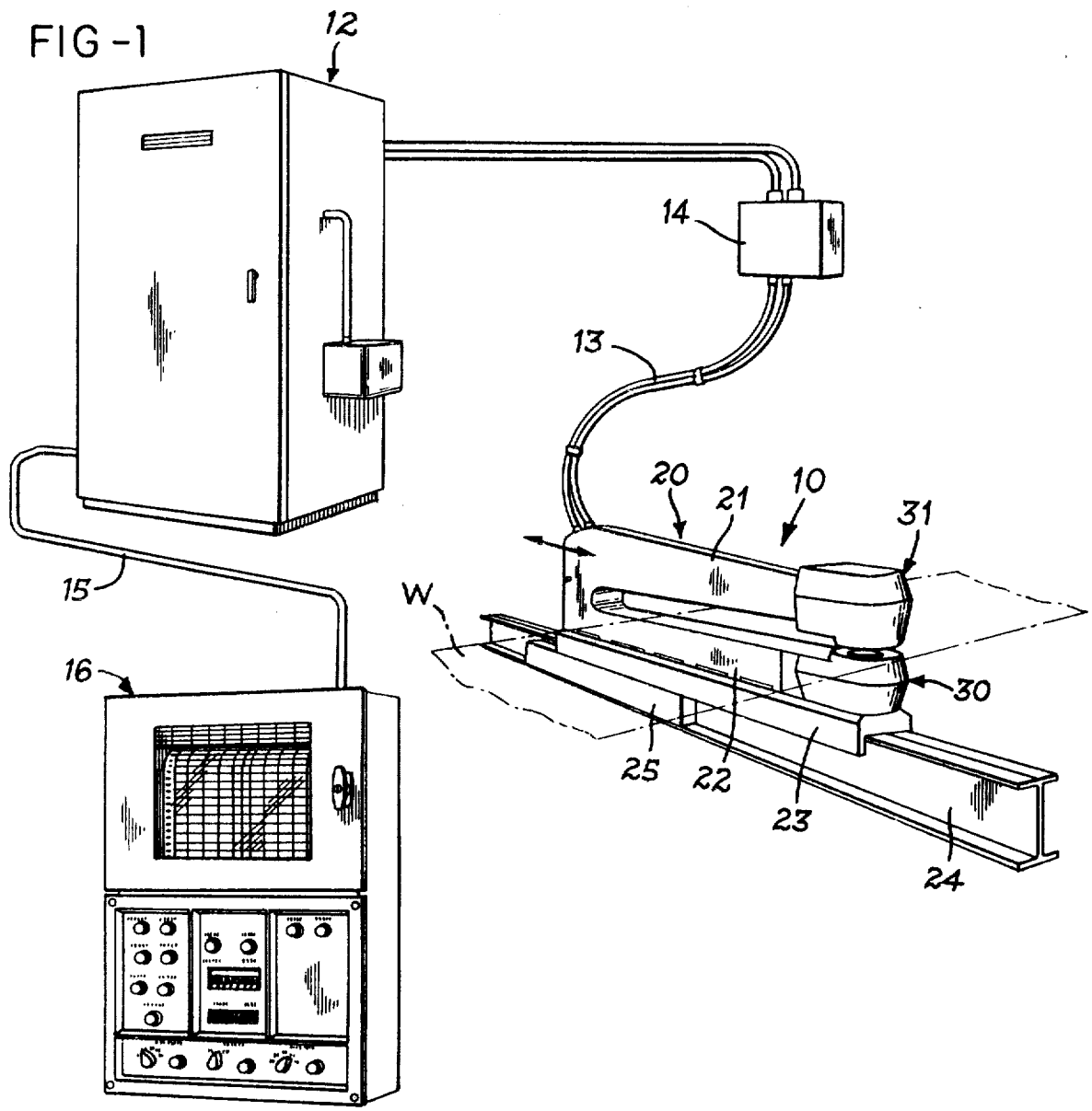
FIG. 1 is a perspective view of a nucleonic thickness gauging system including a shutter assembly constructed in accordance with the invention.
FIG. 2 is an elevational view of the radiation source head partially broken away.

Referring to FIG. 1, a nucleonic thickness measuring gauge 10 is connected to an electronic equipment cabinet 12 through flexible cables 13 and an intermediate disconnect box 14. A conduit 15 leads from the cabinet 12 to a combined recorder and remote control unit 16 located at an operator's station.

The thickness measuring gauge 10 may be of any suitable type utilizing radioactive material as the source, and may be constructed as shown in Chope U.S. Pat. Nos. 2,790,945 of 1957 and 2,829,268 of 1958, both assigned to the same assignee as this invention. Furthermore, it is within the scope of this invention, to employ a backscatter gauge as shown in the above mentioned Holben patent.

As shown in FIG. 1, the gauge 10 includes a C-shaped frame 20 having an upper leg 21 and a lower leg 22 supported by a carriage 23 mounted for traversing movement on a supporting rail 24. A housing 25 is mounted on the rail 24 and encloses a motor which is connected to move the frame 20 in directions as indicated by the arrow 26.

A radiation source head 30 is mounted on the lower leg 22 of the frame 20 and a detector head 31 is mounted on the upper leg 21 directly above the head 30. The heads 30 and 31 cooperate to form a gap or space through which a traveling web W of material is directed. Referring to FIG. 2, the source head 30 includes a member 33 supporting a plate 34 which forms a cover for a cylindrical shaped housing 35 containing a radiation source 36. The plate 34 has a U-shaped opening or aperture 37 (FIG. 3) through which the radiation is directed upwardly towards the detector head 31 as indicated generally by the arrow 38.

The source 36 is preferably of the penetrative radiation type wherein a source of beta, gamma, bremsstrahlung or other type radiation is produced to irradiate the material to be measured. The radiation detector in the detector head 31 may be a scintillation detector or an ionization chamber which is effective to determine the amount of radiation passing through the web W of material. The choice of radiation depends on the character and the density of the material being measured. That is, a useful detector response results from the use of beta or bremsstrahlung radiation for light weight materials but there would be substantially no absorption of a more penetrating radiation such as gamma. On the other hand, it is desirable to use a gamma source in measuring relatively dense material. Typical examples of beta emitters are Strontium 90 and Krypton 85, while Americium 241 and Cesium 137 are suitable gamma emitters.

Referring to FIGS. 3–5, a milled groove 39 is formed within the plate 34 around the aperture 37 and forms a guideway for supporting a shutter 40 having an outwardly projecting rib or flange 41 which projects into the groove 39. Thus the shutter 40 is slidably supported for movement between a closed position, as shown in full lines, and an open position where the shutter is retracted to the left in FIGS. 3 and 4 to open the aperture 37. In the closed position, the flange 41 on the forward end of the shutter 40 is received within the corresponding portion of the groove 39 so that the cooperation between the interfitting flange 41 and groove 39 form an effective seal between the shutter 40 and the plate 34.

The shutter 40 is made of suitable material which resists exceedingly high temperatures such as would occur in a fire and also forms an effective shield to block radiation from the source 36. Suitable materials for the shutter are defined in the Holben and Lehman patents mentioned above.

Means for moving the shutter 40 within the guideway 39 to open the aperture 37 include a solenoid 50 which has its operating coil 51 mounted on an extension plate 52 bolted to the under surface of the plate 34 by screws 53. The solenoid 50 has a T-shaped armature 55 having, at its forward end, a pair of flanges 56 which receive a vertically extending block 57 therebetween. The block 57 supports, at its upper end, a threaded rod 58 which extends generally in the direction of movement of the solenoid armature. An arm 60 (FIG. 3) is mounted on the shutter 40 by screws 61 and depends downwardly to receive the rod 58 projecting through a hole formed within the arm 60. A pair of lock nuts 63 are mounted on the bolt 58 on opposite sides of the arm 60 and provide means for adjustably positioning the shutter 40 in relation to the solenoid armature 55.

The shutter 40 is moved to its closed position upon the deenergization of the solenoid 50 by a pair of retraction or tension springs 65 each having one end secured to the plate 34 by a spring retainer bracket 66 (FIG. 4). The opposite ends of the spring 65 are connected to the solenoid armature 55 by means of a hat bracket 70 which is secured to the flanges 56 by a bolt 71 extending through aligned holes formed within the bracket 70, flanges 56 and block 57. Thus when the solenoid is energized, the assembly including the block 57, the shutter arm 60 and the shutter 40 move to the left (FIG. 3) causing the extension of the springs 66 and the opening of the aperture 37. When the solenoid is deenergized, the springs 66 return the shutter 40 to a position closing the aperture 37.

The invention includes means responsive to the occurrence of a predetermined high temperature for deenergizing the solenoid 50. Preferably this means comprises a heat sensitive or responsive fuse 80 mounted on the plate 52 by suitable fuse clips 82 and wired in series with the coil 51. The heat responsive fuse 80 may be the type TFX manufactured by Bussman Manufacturing Division of McGraw-Edison Company, of St. Louis, Mo., and will interrupt the flow of current to the solenoid when the ambient temperature reaches approximately 300°F. The fuse 80 is provided in the event that electrical power to the solenoid still exists at this temperature, although it can be reasonably expected that by the time this temperature has occurred, either the solenoid itself will have become inoperative or the electrical lines to the solenoid would have become disrupted or otherwise deenergized.

The invention further includes means responsive to the occurrence of a still higher temperature to effect a release of stored energy for locking the shutter in the closed position.

Referring to FIGS. 4 and 5, a threaded opening 85 is formed within the mounting plate 34, and a coaxial blind cylindrical bore 86, slightly smaller in diameter, extends from the opening 85 on a slight inclined angle to the plate surfaces. The bore 86 has a flat end surface 87 positioned in closed spaced relationship to one side of the groove 39 forming the guideway for the shutter 40. A cylindrical fitting 90 is mounted within the bore 86 and has a cylindrical chamber 91 from which extends a smaller cylindrical opening 92 connected by an annular internal shoulder 93.

A hardened pin 95 is mounted within the opening 92 and is formed with a pointed tip 96 and a cylindrical head 98 slidable within the chamber 91. A blank cartridge 100 containing a suitable gunpowder is inserted within the fitting 90 adjacent the head 98 of the pin 95 and is retained by a plug 102 threaded into the opening 85. The blank cartridge 100 is constructed in a manner similar to a shell for a .22 rifle only without the bullet and without primer. It contains a suitable gunpowder which explodes when the cartridge reaches a predetermined temperature. This temperature is above the approximate 300°F mentioned above for the fuse 80, and is, for example, on the order of 400°F or more.

When the cartridge 100 explodes, the pointed tip 90 of the hardened pin 95 is driven through the thin wall formed between the end surface 87 of the bore 86 and the groove 39 (FIG. 5) and deforms the groove 39 and flange 41 to such an extent (FIG. 6) that the shutter 40 is positively locked to the plate 34 and is prevented from moving in a direction which would open the aperture 37. Thus in the event that the ambient temperature surrounding the source head 30 reaches a predetermined temperature such as 300°F, the fuse 80 breaks the circuit to the solenoid 50 so that the tension springs 65 move the shutter 40 to a position closing the aperture 37 and thereby block the exit of the radiation from the source housing 35. A further increase in the ambient temperature will then cause the cartridge 100 to explode so that the hardened pin 95 positively locks the shutter 40 in its closed position and prevents the shutter from opening even in response to a sudden jolt.

A somewhat simplified embodiment of a locking device in accordance with the invention is shown in FIGS. 8–10. In this modification, the fitting 90 and hardened pin 95 shown in FIG. 5 are eliminated and a cylindrical blind hole 110 having a diameter to receive the cartridge 100, is formed within the plate 34'. The hole 110 has a flat end surface 111 in closed spaced relation to the groove 39 supporting one side of close shutter 40 and extends from a larger threaded bore 112. After the cartridge 100 is inserted into the bore 110, a plug 114 is threaded onto the bore 112 to retain the cartridge 100. Thus when the cartridge 100 reaches a predetermined temperature and the gunpowder explodes, the adjacent portion of the groove 39 and the corresponding portion of interfitting flange 41 of the shutter 40 (FIG. 9) are deformed to such an extent that the shutter 40 is locked in the closed position and is prevented from moving so that the radiation is sealed within the source housing 35.

From the drawing and the above description, it can be seen that a radiation gauge constructed in accordance with the present invention provides important safety features which prevent radiation from being released in the event of an accidental fire in the area surrounding the gauge. For example, by employing a sliding shutter which is spring biased toward a closed position to block the radiation and which is moved to an open position by energizing a solenoid, the closing of the shutter in the event of a fire can be assured simply by providing an environmental heat sensitive fuse in series with the solenoid coil. This structure provides a dependable and economical safety means for assuring that the shutter will close when the ambient temperature reaches a predetermined limit.

Another important feature is provided by the use of the stored chemical energy within cartridge 100 and confining the cartridge within the plate 34 either directly adjacent the guideway for the shutter or behind a hardened pin which is adjacent the guideway. That is, the cartridge 100 provides a simple, dependable and economical locking means which will release its chemically stored energy when the ambient temperature reaches a still higher level and thereby assures that the shutter will be retained in its closed position.

The shutter locking system of this invention is entirely self-contained, and while in the preferred embodiment it is shown as being incorporated within the plate 34 comprising the guide for the shutter 40, it is obvious that the relative position of the parts can be reversed. In other words, the cartridge and movable parts could be placed wholly within the shutter 40 and positioned to deform the cooperating parts of the shutter and the shutter guide.

It is also within the scope of this invention to employ any suitable motor for the opening and closing of the shutter 40. Preferably, a single acting motor is used, such as the solenoid disclosed, and it is also within the scope of the invention to employ an air-operated this such as a piston motor. If an air motor is used, it will be deenergized when the air supply line to the motor ruptures or breaks with heat. A short section of plastic tubing can conveniently be incorporated in the air line as an equivalent of the fuse 80 used in this embodiment.

While the forms of apparatus herein described constitute preferred embodiments of the invention, it is to be understood that this invention is not limited to these precise forms of apparatus, and that changes may be made therein without departing from the scope of the invention which is defined in the appended claims.

What is claimed is:

1. A nucleonic radiation measuring instrument comprising a housing enclosing a source of nuclear radiation and having an aperture for releasing radiation from said housing for measurement purposes, a shutter for said aperture, means supporting said shutter for movement between an open position in relation to said aperture and a closed position effectively confining the radiation within said housing, biasing means urging said shutter to said closed position, motor means for moving said shutter from said closed position to said open position, means responsive to the occurrence of a predetermined high ambient temperature for deenergizing said motor means so that said bias means moves said shutter from said open position to said closed position, and means automatically operated when said shutter has been closed in response to said high temperature for locking said shutter in said closed position.

2. A nucleonic radiation measuring instrument comprising a housing enclosing a source of nuclear radiation and having an aperture for releasing radiation from said housing for measurement purposes, a shutter for said aperture, means supporting said shutter for movement between an open position in relation to said aperture and a closed position effectively confining the radiation within said housing, biasing means urging said shutter to said closed position, motor means for moving said shutter from said closed position to said open position, means responsive to the occurrence of a first predetermined high ambient temperature for deenergizing said motor means so that said bias means moves said shutter from said open position to said closed position, and locking means actuated in response to a second ambient temperature in excess of said first predetermined temperature for locking said shutter in said closed position.

3. An instrument as defined in claim 2 wherein said supporting means include means defining a groove-like guideway, flange means projecting from said shutter and slidably mounted within said guideway, and said locking means including means for interlocking said flange means and said guideway.

4. An instrument as defined in claim 3 wherein said interlocking means comprises means defining a hole within said supporting means adjacent said guideway, an explosive cartridge positioned and retained within said hole, and said cartridge being operable to explode upon the attainment of said second ambient temperature and thereby deform said guideway and said flange means to lock said shutter in its said closed position.

5. An instrument as defined in claim 3 wherein said interlocking means comprises means defining a hole within said supporting means adjacent said guideway, a hardened pin within said hole, an explosive cartridge positioned and retained adjacent said pin, and said cartridge being operable to explode upon the attainment of said second ambient temperature and thereby deform said guideway and said flange means to lock said shutter in its said closed position.

6. An instrument as defined in claim 1 wherein said motor means comprises an electrically actuated motor, and said means responsive to said predetermined temperature for deenergizing said motor means comprises an ambient temperature sensing fuse connected electrically in circuit with said motor.

7. In a nucleonic radiation energy measuring instrument having a source of nuclear energy and incorporating a temperature responsive safety lock in which a shutter member is mounted on a guide member for movement between a retracted position defining an opening for radiation measurement purposes and a closed position effectively confining radiation from said source, a shutter locking mechanism comprising means responsive to a first predetermined high temperature for moving said shutter to said closed position, and means responsive to a second temperature higher than said first temperature for locking said shutter in said closed position.

8. A nucleonic radiation measuring instrument having a source of nuclear radiation and a shutter assembly comprising a shutter member which is guided for movement and normally operably movable between a retracted position defining an opening for radiation measurement purposes and a closed position effectively confining said source and the radiation therefrom, and a shutter locking mechanism having means responsive to temperatures greater than a predetermined temperature for moving said shutter to said closed position and for locking said shutter in said closed position so that said shutter is effectively no longer operably movable to said retracted position.

* * * * *